(12) United States Patent
Chapman et al.

(10) Patent No.: US 10,523,270 B1
(45) Date of Patent: Dec. 31, 2019

(54) FULL DUPLEX (FDX) ENHANCED NODE

(71) Applicant: Cisco Technology, Inc., San Jose, CA (US)

(72) Inventors: John T. Chapman, Coto de Caza, CA (US); Hang Jin, Plano, TX (US); John Holobinko, Fort Mill, SC (US); Yubin Chen, Shanghai (CN); John Alexander Ritchie, Jr., Duluth, GA (US); Martin Mattingly, Grayson, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/008,737

(22) Filed: Jun. 14, 2018

(51) Int. Cl.
*H04L 5/14* (2006.01)
*H04B 3/23* (2006.01)
*H04L 12/28* (2006.01)

(52) U.S. Cl.
CPC ............... *H04B 3/23* (2013.01); *H04L 5/14* (2013.01); *H04L 12/2801* (2013.01)

(58) Field of Classification Search
CPC . H04L 5/00; H04L 5/0001; H04L 5/14; H04L 5/1415; H04L 12/2801; H04L 12/2805; H04L 12/2818; H04L 12/2858; H04L 12/2861; H04B 3/23
See application file for complete search history.

(56) References Cited

U.S. PATENT DOCUMENTS

2019/0020577 A1* 1/2019 Chapman ........... H04Q 11/0067
2019/0109760 A1* 4/2019 Rupe .................. H04L 41/0672

* cited by examiner

*Primary Examiner* — Siu M Lee (74) *Attorney, Agent, or Firm* — Merchant & Gould P.C.

(57) ABSTRACT

Full Duplex (FDX) enhanced node deployment may be provided. First, a first device level may be provided comprising a first plurality of FDX enhanced nodes. The first plurality of FDX enhanced nodes may comprise a first FDX enhanced node and a second FDX enhanced node. The first plurality of FDX enhanced nodes may be operated in a first mode. Next, a second device level may be provided comprising a third FDX enhanced node. The second device level may be upstream from the first device level. The third FDX enhanced node may be operated in a second mode. Then an input port of the first FDX enhanced node and an input port of the second FDX enhanced node may be provided with a same type of input that is being provided to an input port of the third FDX enhanced node. The first plurality of FDX enhanced nodes may then be switched from being operated in the first mode to being operated in the second mode.

20 Claims, 6 Drawing Sheets

FULL DUPLEX (FDX) ENHANCED NODE

TECHNICAL FIELD

The present disclosure relates generally to downstream node deployment.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Full Duplex (FDX) enhanced node deployment may be provided. First, a first device level may be provided comprising a first plurality of FDX enhanced nodes. The first plurality of FDX enhanced nodes may comprise a first FDX enhanced node and a second FDX enhanced node. The first plurality of FDX enhanced nodes may be operated in a first mode. Next, a second device level may be provided comprising a third FDX enhanced node. The second device level may be upstream from the first device level. The third FDX enhanced node may be operated in a second mode. Then an input port of the first FDX enhanced node and an input port of the second FDX enhanced node may be provided with a same type of input that is being provided to an input port of the third FDX enhanced node. The first plurality of FDX enhanced nodes may then be switched from being operated in the first mode to being operated in the second mode.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems that provide content from a headend. The headend may comprise, but is not limited to, a cable television headend that may comprise a master facility for receiving television signals for processing and distribution over a cable television system. Fiber deep (FD) may comprise a trend in which MSOs push fiber ever closer to customers to provide them with better service. In order to provide FD, many Data Over Cable Service Interface Specification (DOCSIS) compliant Hybrid Fiber-Coaxial (HFC) devices may be deployed onto an FD HFC network. These deployed devices may comprise, for example, Full Duplex (FDX) Remote PHY (RPD) nodes and FDX amplifiers. FDX RPD nodes and FDX amplifiers may amplify bi-directional full duplex traffic on the HFC that may share frequency spectrum in both an upstream (US) direction and a downstream (DS) direction on the HFC. Non FDX RPD nodes and Non FDX amplifiers may not share frequency spectrum.

FDX amplifiers may utilize coaxial cables on both an US side and a DS side. As opposed to FDX amplifiers, FDX RPD nodes may send and receive signals from an MSO headend via fiber optic cable on the US side rather than via coaxial cable, but may use coaxial cables on the DS side. Accordingly, FDX RPD nodes may be located at a junction of a fiber plant and a coaxial plant in the HFC network. Furthermore, FDX RPD nodes may include remote PHY circuitry that may implement the physical layer functionality that was conventionally perform at a Cable Modem Termination System (CMTS) located at the headend operated by the MSO.

MSOs may wish to upgrade their HFCs to adopt FD. In addition, the MSOs may wish to upgrade their HFCs to operate in FDX (e.g., DOCSIS compliant FDX), for example, to resolve DOCSIS US throughput shortfalls. Consistent with embodiments of the disclosure, methods for deploying FDX enhanced nodes may be disclosed. These disclosed methods for deploying FDX enhanced nodes, for example, may allow the MSOs to gradually replace coaxial cable with fiber in their HFC networks, thus allowing them to upgrade to FD and FDX in an efficient manner.

Figure 1:
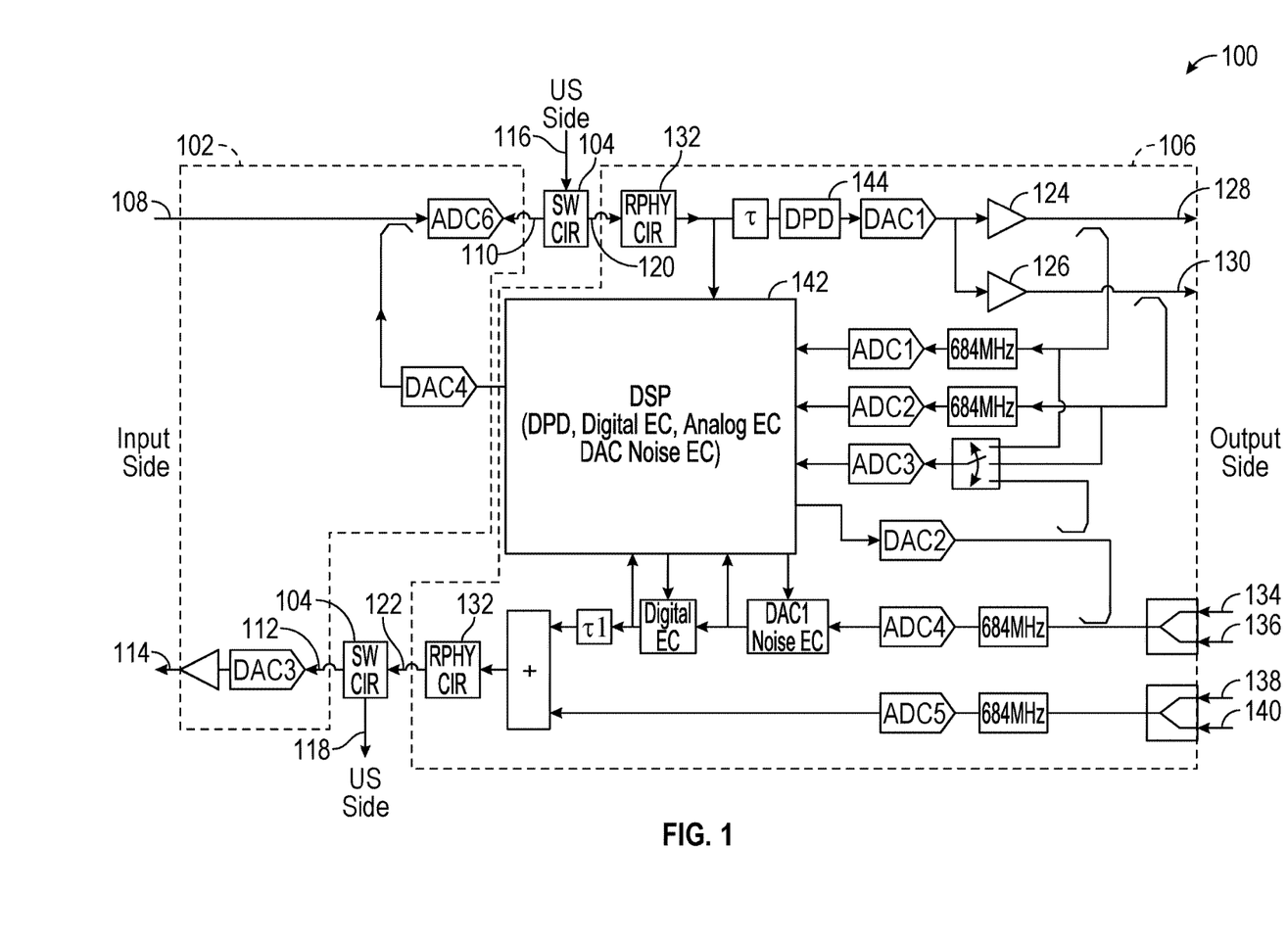
FIG. 1 is a block diagram of a Full Duplex (FDX) enhanced node.

FIG. 1 is a block diagram of a full duplex (FDX) enhanced node 100. FDX enhanced node 100 may operate in two modes comprising a first mode and a second mode. The first mode may comprise an enhanced mode in which FDX enhanced node 100 may operate as an FDX amplifier. The second mode may comprise a normal mode in which FDX enhanced node 100 may operate as an FDX RPD node. FDX enhanced node 100 may be switched between the first mode and the second mode, for example, through remote software configuration. When operating in the second mode, FDX enhanced node 100 may ignore its radio frequency (RF) input (e.g., coaxial cable) and instead may use a new fiber optic cable that may have been extended to it so that it can operate in the second mode as described in greater detail below. The coaxial cable may still be connected and may still serve customers and provide AC power to FDX enhanced node 100 for example.

As shown in FIG. 1, FDX enhanced node 100 may comprise a radio frequency (RF) interface 102, switching circuitry 104, and a Remote PHY device (RPD) component 106. RF interface 102 may comprise an RF interface downstream analog input 108, an RF interface downstream digital output 110, an RF interface upstream digital input 112, and an RF interface upstream analog output 114. Switching circuitry 104 may have a first downstream digital input 116 and a first upstream digital output 118. RPD component 106 may have a downstream digital input 120 and an upstream digital output 122. Consistent with embodiments of the disclosure, through remote software configuration, switching circuitry 104 may: i) switch downstream digital input 120 of RPD component 106 between RF interface downstream digital output 110 and first downstream digital input 116; and ii) switch upstream digital output 122 of RPD component 106 between RF interface upstream digital input 112 and first upstream digital output 118.

Regarding DS traffic when FDX enhanced node 100 is operating in the enhanced mode in which FDX enhanced node 100 may operate as an FDX amplifier, RF interface 102 may receive (e.g., from a node or amplifier) the DS traffic via coaxial cable on RF interface downstream analog input 108. RF interface 102 may convert the analog DS traffic to digital (e.g., via DACE) and pass it on to RF interface downstream digital output 110. Switching circuitry 104 may cause the digital DS traffic to be sent to downstream digital input 120 of RPD component 106. As will described in greater detail below, various Echo Cancellation (EC) processes may be performed by RPD component 106. The digital DS traffic may then be converted to analog (e.g., via DAC1), amplified by a first forward launch amplifier 124 and a second forward launch amplifier 126, and respectively provided to a first downstream port 128 and a second downstream port 130. When FDX enhanced node 100 is operating as an FDX amplifier, the digital DS traffic may bypass RPHY circuitry 132 or RPHY circuitry 132 may be turned off. RPHY circuitry 132 may implement the physical layer functionality of the CMTS, but when FDX enhanced node 100 is operating as an FDX amplifier, this functionality has already been performed upstream.

Regarding DS traffic when FDX enhanced node 100 is operating in the normal mode in which FDX enhanced node 100 may operate as an FDX RPD node, the DS traffic may already be digital and received at first downstream digital input 116 from the MSO's headend via fiber optic cable. RF interface 102 may be turned off and switched out in this mode. Switching circuitry 104 may cause the digital DS traffic from first downstream digital input 116 to be sent to downstream digital input 120 of RPD component 106. RPHY circuitry 132 may implement the physical layer functionality of the CMTS when FDX enhanced node 100 is operating as an FDX RPD node because this functionality has not been performed upstream. As will described in greater detail below, various EC processes may be performed by RPD component 106. The digital DS traffic may then be converted to analog (e.g., via DAC1), amplified by first forward launch amplifier 124 and second forward launch amplifier 126, and respectively provided to first downstream port 128 and second downstream port 130.

Regarding US traffic when FDX enhanced node 100 is operating in the enhanced mode in which FDX enhanced node 100 may operate as an FDX amplifier, RPD component 106 may receive (e.g., from customer premises equipment) analog US traffic via coaxial cable on a first upstream port 134 and a second upstream port 136. The analog US traffic may be converted to digital (e.g., via ADC4). As will described in greater detail below, various EC processes may be performed by RPD component 106. Switching circuitry 104 may cause the digital US traffic from upstream digital output 122 to be sent to RF interface upstream digital input 112 of RF interface 102. RF interface 102 may convert the US digital signal to analog (e.g., via DAC3), amplify it, and output it on RF interface upstream analog output 114. From RF interface upstream analog output 114, the US analogy signal may be sent to a node or amplifier via coxial cable. When FDX enhanced node 100 is operating as an FDX amplifier, the digital US traffic may bypass RPHY circuitry 132 or RPHY circuitry 132 may be turned off. RPHY circuitry 132 may implement the physical layer functionality of the CMTS, but when FDX enhanced node 100 is operating as an FDX amplifier, this functionality may be performed upstream.

RPD component 106 may further comprise a conventional, non-FDX first upstream port 138 and a conventional, non-FDX a second upstream port 140. When these are used, frequency spectrum may not be shared in both an US direction and a DS direction on the HFC.

Regarding US traffic when FDX enhanced node 100 is operating in the normal mode in which FDX enhanced node 100 may operate as an FDX RPD node, RPD component 106 may receive (e.g., from customer premises equipment) analog US traffic via coxial cable on a first upstream port 134 and a second upstream port 136. The analog US traffic may be converted to digital (e.g., via ADC4). As will described in greater detail below, various EC processes may be performed by RPD component 106. Switching circuitry 104 may cause the digital US traffic from upstream digital output 122 to be sent to first upstream digital output 118. From first upstream digital output 118, the US digital signal may be sent to the MSO's headend. When FDX enhanced node 100 is operating as an FDX RPD node, the digital US traffic may be processed by RPHY circuitry 132. RPHY circuitry 132 may implement the physical layer functionality of the CMTS.

As stated above, various EC processes may be performed by RPD component 106 in order to support FDX in FDX enhanced node 100 when operating as an FDX amplifier or when operating as an FDX RPD node. The EC processes used when operating as an FDX RPD node may differ from the EC processes used when operating as an FDX amplifier. For example, when FDX enhanced node 100 is operating as an FDX RPD node, there may only be one receiver (e.g., an US receiver). In this case, the EC processes may suppress the echoes from the DS output ports to the US receiver. This is described in greater detail in U.S. patent application Ser. No. 15/943,982, filed on Apr. 3, 2018 and entitled "DIGITAL ECHO CANCELLATION WITH SINGLE FEEDBACK", which is incorporated by reference herein in its entirety. Furthermore, when FDX enhanced node 100 is operating as an FDX RPD node, there may be two receivers, one US receiver on the output ports and one DS receiver on the input port. EC may be used for both receivers. This is described in greater detail in U.S. patent application Ser. No. 15/956,902, filed on Apr. 19, 2018 and entitled "AMPLIFIER SUPPORTING FULL DUPLEX (FDX) OPERATIONS", which is incorporated by reference herein in its entirety.

EC for the FDX RPD node may comprise two parts: i) digital EC; and ii) analog EC. With digital EC, the EC may be implemented in the digital domain for each Orthogonal Frequency-Division Multiplexing (OFDM) subcarrier after Fast Fourier transform (FFT). With analog EC, the EC may be implemented in the analog domain before receiver ADC (e.g., ADC4). The purpose of analog EC may be to avoid receiver ADC saturation by echoes that could be, for example, 20 dB~25 dB higher than the desired US signal in power. This is described in greater detail in U.S. patent application Ser. No. 15/957,079, filed on Apr. 19, 2018 and entitled "ANALOG ECHO CANCELLATION WITH DIGITAL-TO-ANALOG CONVERTER NOISE SUPPRESSION", which is incorporated by reference herein in its entirety. The EC coefficients may be computed in the digital domain for each OFDM subcarrier. As analog EC may be performed in analog domain before receiver ADC (e.g., ADC4), IFFT and up-conversion may be needed to convert the EC correcting signal to the analog domain.

Elements comprising RPD component 106 may include, for example, Digital signal Processor 142, Digital Pre-Distortion actuator 144, and RPHY circuitry 132. Each of these elements may be embodied in hardware and/or in software (including firmware, resident software, microcode, etc.) or in any other circuits or systems. For example, each of the elements in RPD component 106 may be practiced in an electrical circuit comprising discrete electronic elements, packaged or integrated electronic chips containing logic gates, a circuit utilizing a microprocessor, or on a single chip containing electronic elements or microprocessors. Furthermore, each of the elements in RPD component 106 may also be practiced using other technologies capable of performing logical operations such as, for example, AND, OR, and NOT, including but not limited to, mechanical, optical, fluidic, and quantum technologies. In addition, each of the elements in RPD component 106 may be practiced in a computing device 400 as described in greater detail below with respect to FIG. 4.

Figure 2A:
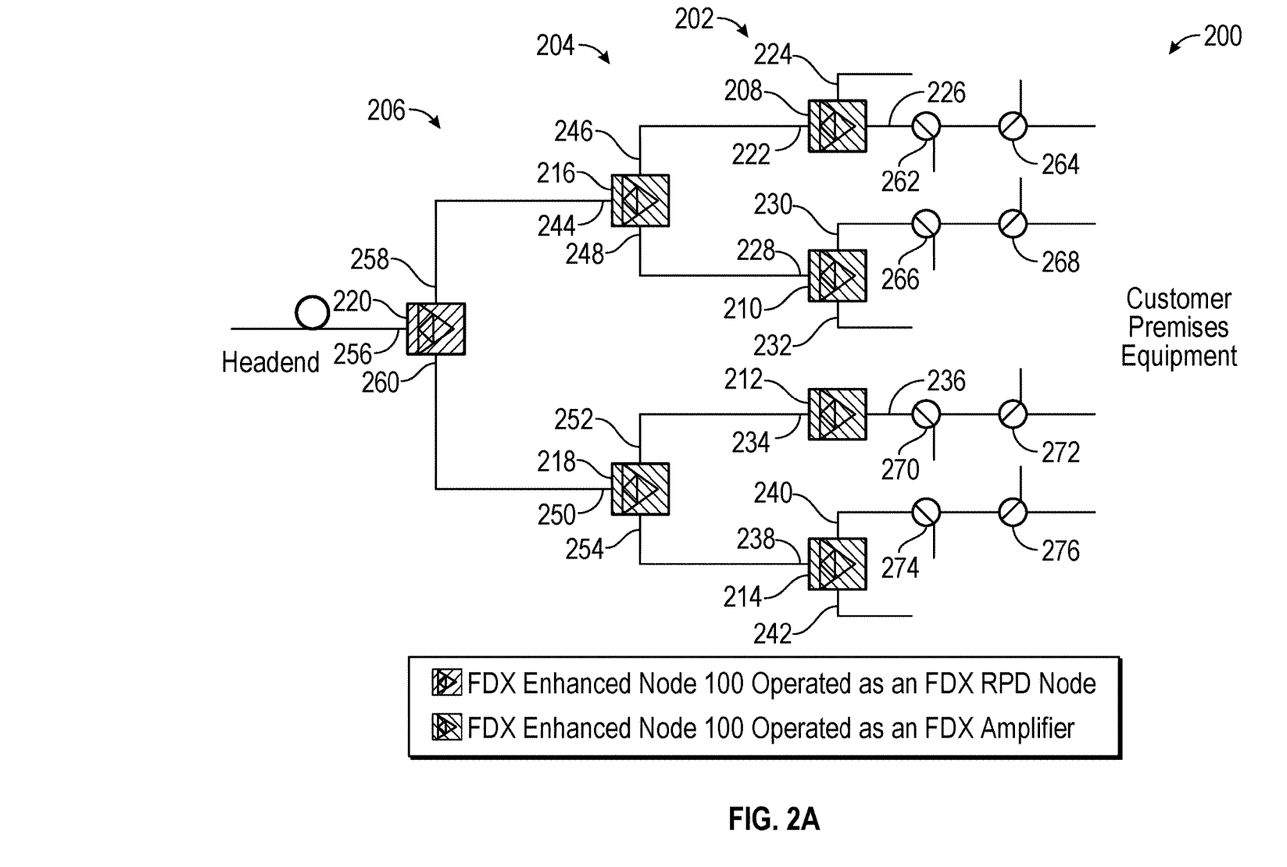
FIG. 2A, FIG. 2B, and FIG. 2C are block diagrams illustrating a migration path for deploying Full Duplex (FDX) enhanced nodes.
Figure 2B:
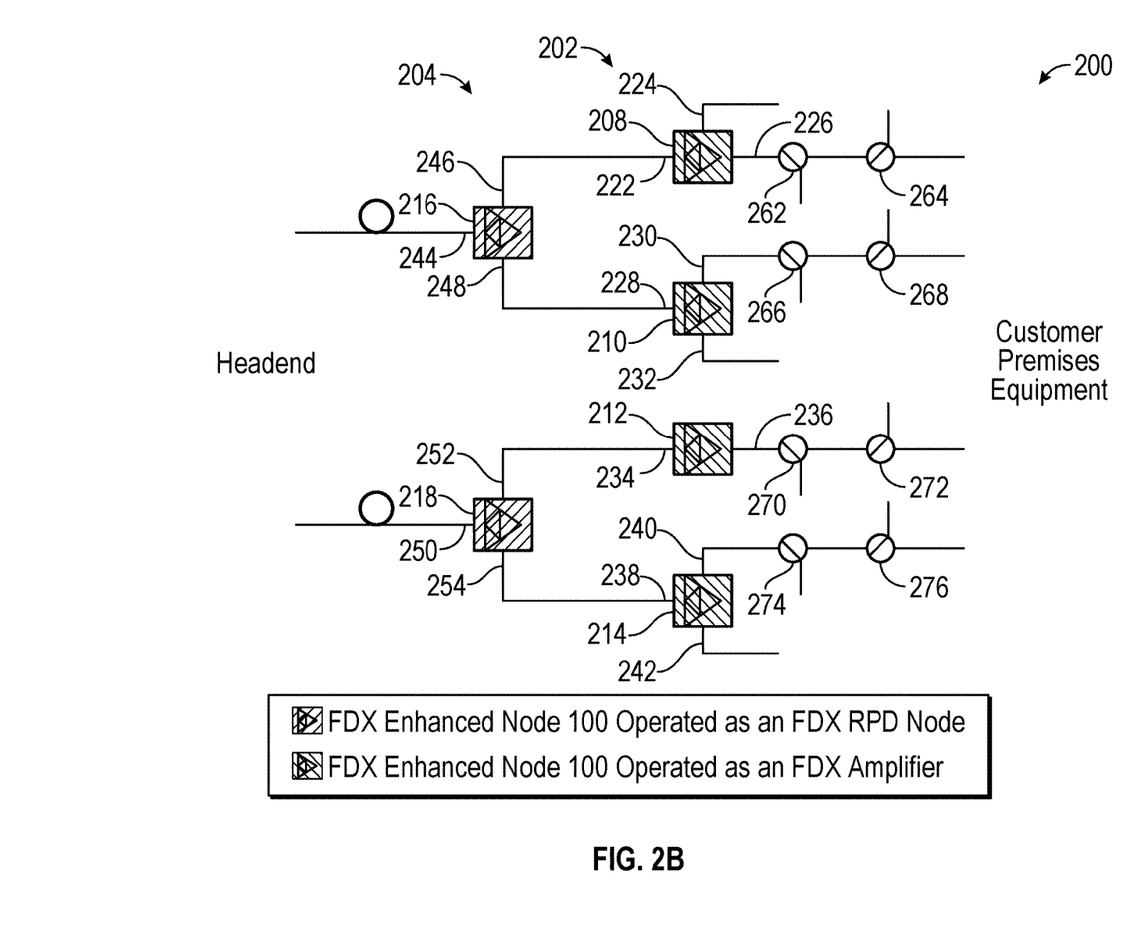
Figure 2C:
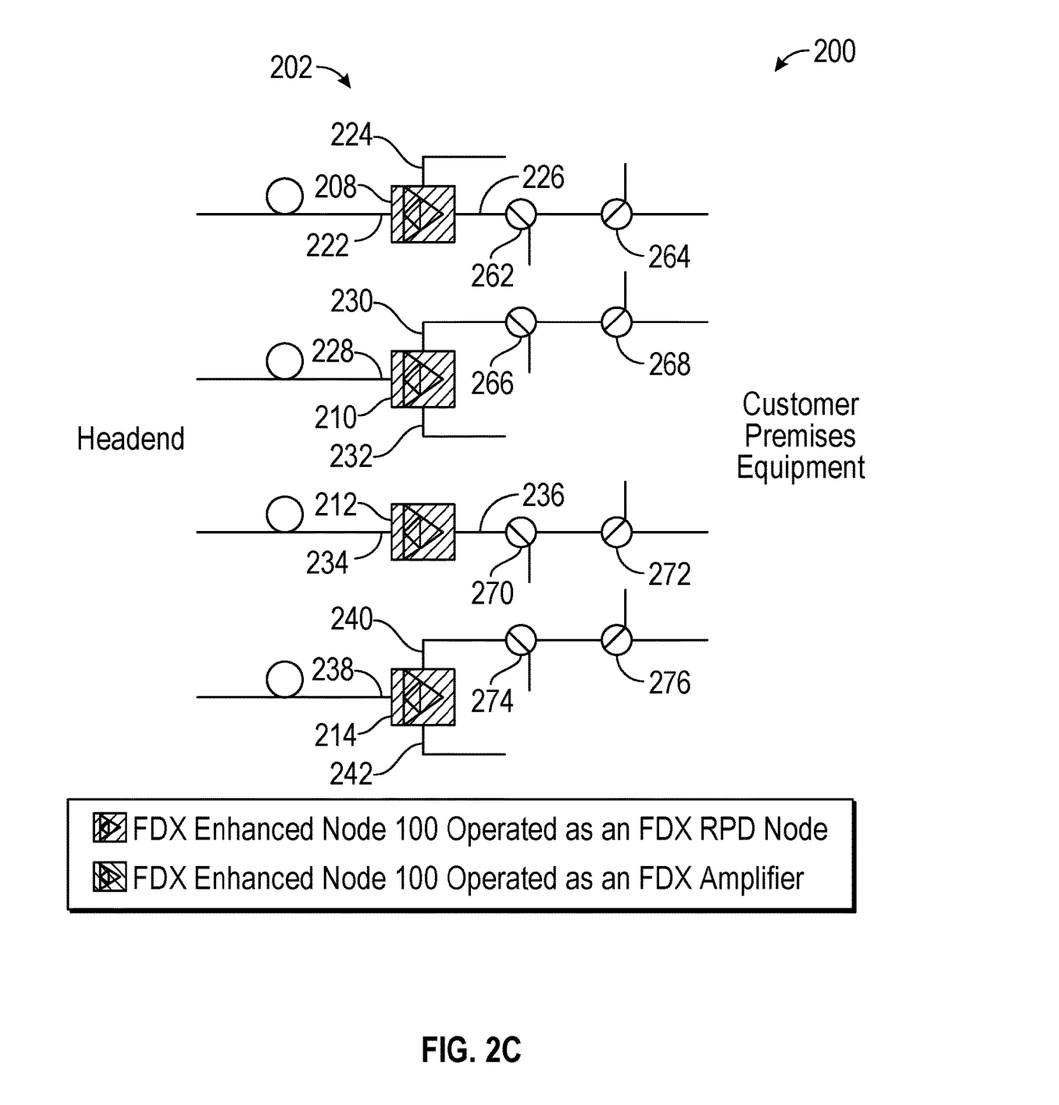

FIG. 2A, FIG. 2B, and FIG. 2C are block diagrams illustrating a migration path for deploying Full Duplex (FDX) enhanced nodes. The FDX enhanced nodes shown in FIG. 2A, FIG. 2B, FIG. 2C may each comprise FDX enhanced node 100 described above with respect to FIG. 1. As shown in FIG. 2A, an HFC network 200 may comprise a first device level 202, a second device level 204, and a third device level 206. First device level 202 may comprise a first FDX enhanced node 208, a second FDX enhanced node 210, a fifth FDX enhanced node 212, and a sixth FDX enhanced node 214. Second device level 204 may comprise a third FDX enhanced node 216 and a seventh FDX enhanced node 218. Third device level 206 may comprise a fourth FDX enhanced node 220.

At first device level 202, first FDX enhanced node 208 may comprise an input port 222, a first output port 224, and a second output port 226. Second FDX enhanced node 210 may comprise an input port 228, a first output port 230, and a second output port 232. Fifth FDX enhanced node 212 may comprise an input port 234 and a first output port 236. Sixth FDX enhanced node 214 may comprise an input port 238, a first output port 240, and a second output port 242. At second device level 204, third FDX enhanced node 216 may comprise an input port 244, a first output port 246, and a second output port 248. Seventh FDX enhanced node 218 may comprise an input port 250, a first output port 252, and a second output port 254. And at third device level 206, fourth FDX enhanced node 220 may comprise an input port 256, a first output port 258, and a second output port 260. The FDX enhanced nodes shown in FIG. 2A, FIG. 2B, and FIG. 2C may comprise any number of output ports and are not limited to those shown.

Second output port 226 of first FDX enhanced node 208 may feed first tap 262 and second tap 264, which in turn may feed other taps or customer premises equipment. First output port 224 of first FDX enhanced node 208 may feed taps and customer premises equipment as well. First output port 230 of second FDX enhanced node 210 may feed first tap 266 and second tap 268, which in turn may feed other taps or customer premises equipment. Second output port 232 of second FDX enhanced node 210 may feed taps and customer premises equipment as well. First output port 236 of fifth FDX enhanced node 212 may feed first tap 270 and second tap 272, which in turn may feed other taps or customer premises equipment. First output port 240 of sixth FDX enhanced node 214 may feed first tap 274 and second tap 276, which in turn may feed other taps or customer premises equipment. Second output port 242 of sixth FDX enhanced node 214 may feed taps and customer premises equipment as well.

The aforementioned customer premises equipment may comprise, for example, any terminal and associated equipment located at a subscriber's premises and connected with an MSO's telecommunication channel at a demarcation point. The aforementioned customer premises equipment may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

The architecture of HFC network 200 may be represented as N+M, where N stands for node, and M stands for the number of cascaded amplifiers following the node toward the customer premises equipment. M, for example, may be in the range of 3-10, depending on the size of the Service Group (SG). As stated above, MSOs wish to move to FD where nodes (e.g., RPD nodes) may include remote PHY circuitry that may implement the physical layer functionality that was conventionally perform at a Cable Modem Termination System (CMTS) located at the headend operated by the MSO. In implementing FD, MSOs wish to make an RPD node the last active device (i.e., N+0) by reducing the size of SGs to meet increasing user capacity demands. In addition, MSOs wish to adopt Full Duplex (FDX) DOCSIS to resolve DOCSIS US throughput shortfalls.

Migrating from N+M, where M=3~10) to N+0 may require substantial new fiber optic cable layout and coaxial cable re-cabling thus leading to substantial costs (e.g., CAPEX). In addition, the capacity offered with N+0 may be well over current requirements. For example, with Households Passed=60 per node for N+0, and 10G DS/5G US per FDX RPD, the average capacity per Cable Modem (CM) may be well over the conventional current average capacity required.

Accordingly, embodiments of the disclosure may provide a process for upgrading an HFC that may allow: i) deployment of N+M, where M>0, to reduce fiber optic cable layout and coaxial cable re-cabling CAPEX; ii) adoption of FDX to resolve US throughput shortfall; and iii) seamless and incremental migration to N+M', where 0<=M'<M, to meet the increasing user capacity demands in the future. In order to provide this, embodiments of the disclosure may include an FDX enhanced node that can operate in two modes. The two modes may comprise a normal mode (e.g., the node operates as a FDX DOCSIS RPD node) and an enhanced mode (e.g., the node operates as a FDX DOCSIS amplifier). The mode switch may be accomplished through remote software configuration. In addition, embodiments of the disclosure may include a network upgrading process that embraces N+m (e.g., lower case m may be used to indicate that the amplifiers are FDX enhanced nodes in amplifier mode. They differ from the legacy amplifiers, which can only operate in amplifier mode. Legacy amplifiers may be indicated with upper case M). In this case, m may stand for the number of the cascaded FDX enhanced nodes that operate in amplifier mode. Gradually, m may be reduced as needed by switching FDX enhanced nodes from amplifier mode to RPD mode, and only pulling fiber from the current fiber drop to the newly added FDX RPD node. For example, FIG. 2A may be represented by N+2, FIG. 2B may be represented by N+1, and FIG. 2C may be represented by N+0.

Embodiments of the disclosure may comprise a done once embodiment and an incremental embodiment. In the done once embodiment, the N+m (m>0) may be designed in year 1 with a full consideration of its migration path toward to N+0. In the future, m may be gradually reduced by switching FDX enhanced nodes from amplifier mode to RPD node mode without re-cabling the coaxial cable network. The main effort to migrate toward N+0 is to pull extra fiber to the newly added FDX RPD node. With the incremental embodiment, the N+m may be optimized for minimal CAPEX in year 1 (e.g., minimal fiber optic cable layout and coaxial cabling). In the future, when m is reduced by switching FDX enhanced node from amplifier mode to RPD node mode, in addition to the new fiber layout, some re-cabling may be required.

For example, FIG. 2A may represent N+m, where m=2 and where the FDX enhanced nodes in first device level 202 and second device level 204 may be operated in the enhanced mode as FDX amplifiers and the FDX enhanced nodes in third device level 206 may be operated in the normal mode as an FDX RPD nodes. FIG. 2B may represent N+m, where m=1 and where the FDX enhanced nodes in first device level 202 may be operated in the enhanced mode as FDX amplifiers and the FDX enhanced nodes in second device level 204 may be operated in the normal mode as an FDX RPD nodes. FIG. 2C may represent N+m, where m=0 and where the FDX enhanced nodes in first device level 202 may be operated in the normal mode as an FDX RPD nodes. As such, FD may be implemented by FIG. 2C where the last active devices between the MSO headend and customer premises equipment are FDX RPD nodes.

Figure 3:
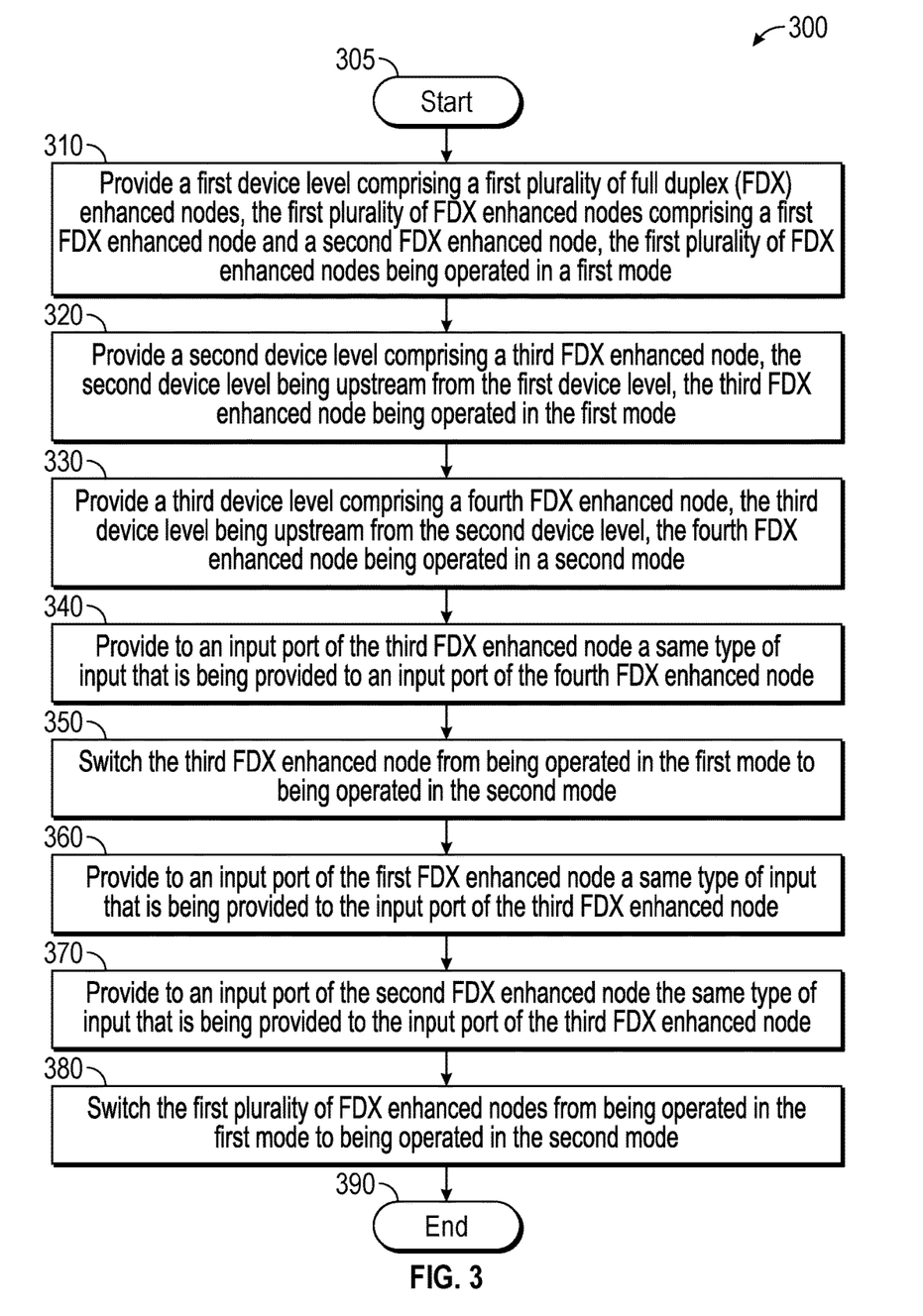
FIG. 3 is a flow chart of a method for deploying Full Duplex (FDX) enhanced nodes.

FIG. 3 is a flow chart setting forth the general stages involved in a method 300 consistent with an embodiment of the disclosure for deploying FDX enhanced nodes. Ways to implement the stages of method 300 will be described in greater detail below.

Method 300 may begin at starting block 305 and proceed to stage 310 where first device level 202 may be provided. For example, first device level 202 may comprise a first plurality of full duplex (FDX) enhanced nodes (e.g., FDX enhanced node 100) provided in HFC network 200 by an MSO. As shown in FIG. 2A and FIG. 2B, the first plurality of FDX enhanced nodes may comprise first FDX enhanced node 208 and second FDX enhanced node 210. The first plurality of FDX enhanced nodes may be operated in the first mode. The first mode may comprise the enhanced mode in which the first plurality of FDX enhanced nodes may operate as FDX amplifiers.

From stage 310, where first device level 202 is provided, method 300 may advance to stage 320 where second device level 204 may be provided. For example, second device level 204 may comprise a second plurality of FDX enhanced nodes (e.g., FDX enhanced node 100) provided in HFC network 200 by the MSO. Second device level 204 may be upstream from first device level 202. As shown in FIG. 2A, second device level 204 may comprise third FDX enhanced node 216 that may be operated in the first mode as an FDX amplifier.

Once second device level 204 is provided in stage 320, method 300 may continue to stage 330 where third device level 206 may be provided. For example, third device level 206 may comprise an FDX enhanced node (e.g., FDX enhanced node 100) provided in HFC network 200 by the MSO. Third device level 206 may be upstream from second device level 204. As shown in FIG. 2A, third device level may comprise fourth FDX enhanced node 220 that may be operated in a second mode. The second mode may comprise a normal mode in which fourth FDX enhanced node 220 may operate as an FDX RPD node.

After third device level 206 is provided in stage 330, method 300 may proceed to stage 340 where input port 244 of third FDX enhanced node 216 may be provided with a same type of input that is being provided to input port 256 of fourth FDX enhanced node 220. For example, as shown in FIG. 2A, a fiber optic cable may feed input port 256 of fourth FDX enhanced node 220 from the MSO's headend. This fiber optic cable may be split or otherwise extended to feed input port 244 of third FDX enhanced node 216. At this point both input port 244 of third FDX enhanced node 216 and input port 256 of fourth FDX enhanced node 220 may be fed by fiber optic cable through a small form factor 10G plug-in (SFP) connector for example. A coaxial cable that previously extended between fourth FDX enhanced node 220 and third FDX enhanced node 216 may be disconnected and removed or otherwise abandoned. Fourth FDX enhanced node 220 may stay in place and continue to feed subscribers in its local neighborhoods.

From stage 340, where input port 244 of third FDX enhanced node 216 is provided with the same type of input that is being provided to input port 256 of fourth FDX enhanced node 220, method 300 may advance to stage 350 where third FDX enhanced node 216 may be switched from being operated in the first mode to being operated in the second mode. For example, because third FDX enhanced node 216 now has a fiber optic cable feeding it from the MSO's headend, it may now be switched to operate as a node instead of an amplifier, as shown in FIG. 2B. Third FDX enhanced node 216 may be switched between the first mode and the second mode, for example, through remote software configuration. The process described above in stages 340 and 350 may also be performed in conjunction with seventh FDX enhanced node 216, thus moving HFC network 200 from N+2 (e.g., FIG. 2A) to N+1 (e.g., FIG. 2B).

Once third FDX enhanced node 216 is switched from being operated in the first mode to being operated in the second mode in stage 350, method 300 may continue to stage 360 where input port 222 of first FDX enhanced node 208 may be provided with a same type of input that is being provided to input port 244 of third FDX enhanced node 216. For example, as shown in FIG. 2B, a fiber optic cable may feed input port 244 of third FDX enhanced node 216 from the MSO's headend. This fiber optic cable may be split or otherwise extended to feed input port 222 of first FDX enhanced node 208. At this point both input port 222 of first FDX enhanced node 208 and input port 244 of third FDX enhanced node 216 may be fed by fiber optic cable through a small form factor 10G plug-in (SFP) connector for example. Third FDX enhanced node 216 may stay in place and continue to feed subscribers in its local neighborhoods.

After input port 222 of first FDX enhanced node 208 is provided with the same type of input that is being provided to input port 244 of third FDX enhanced node 216 in stage 360, method 300 may proceed to stage 370 where input port 228 of second FDX enhanced node 210 may be provided with a same type of input that is being provided to input port 244 of third FDX enhanced node 216. For example, as shown in FIG. 2B, a fiber optic cable may feed input port 244 of third FDX enhanced node 216 from the MSO's headend. This fiber optic cable may be split or otherwise extended to feed input port 228 of second FDX enhanced node 210. At this point both input port 228 of second FDX enhanced node 218 and input port 244 of third FDX enhanced node 216 may be fed by fiber optic cable through a small form factor 10G plug-in (SFP) connector for example. The process described above in stages 360 and 370 may also be performed in conjunction with fifth FDX enhanced node 212 and sixth FDX enhanced node 214 to bring fiber optic cable to them as well. As such, all FDX enhanced nodes in first device level 202 may be fed by fiber optic cable from the MSO's headend.

From stage 370, where the upstream input of third FDX enhanced node 216 is provided to an upstream input of second FDX enhanced node 210, method 300 may advance to stage 380 where the first plurality of FDX enhanced nodes may be switched from being operated in the first mode to being operated in the second mode. For example, because all the first plurality of FDX enhanced nodes (i.e., FDX enhanced nodes in first device level 202) now have fiber optic cable feeding them from the MSO's headend, they may now be switched to operate as nodes instead of amplifiers, as shown in FIG. 2C. The first plurality of FDX enhanced nodes may be switched between the first mode and the second mode, for example, through remote software configuration. Accordingly, HFC network 200 may be moved from N+1 (e.g., FIG. 2B) to N+0 (e.g., FIG. 2C). The second plurality of FDX enhanced nodes of second device level 204 and the third plurality of FDX enhanced nodes of third device level 206 may stay in place in HFC network 200 and continue to feed subscribers in its local neighborhoods. Once the first plurality of FDX enhanced nodes are switched from being operated in the first mode to being operated in the second mode in stage 380, method 300 may then end at stage 390.

Figure 4:
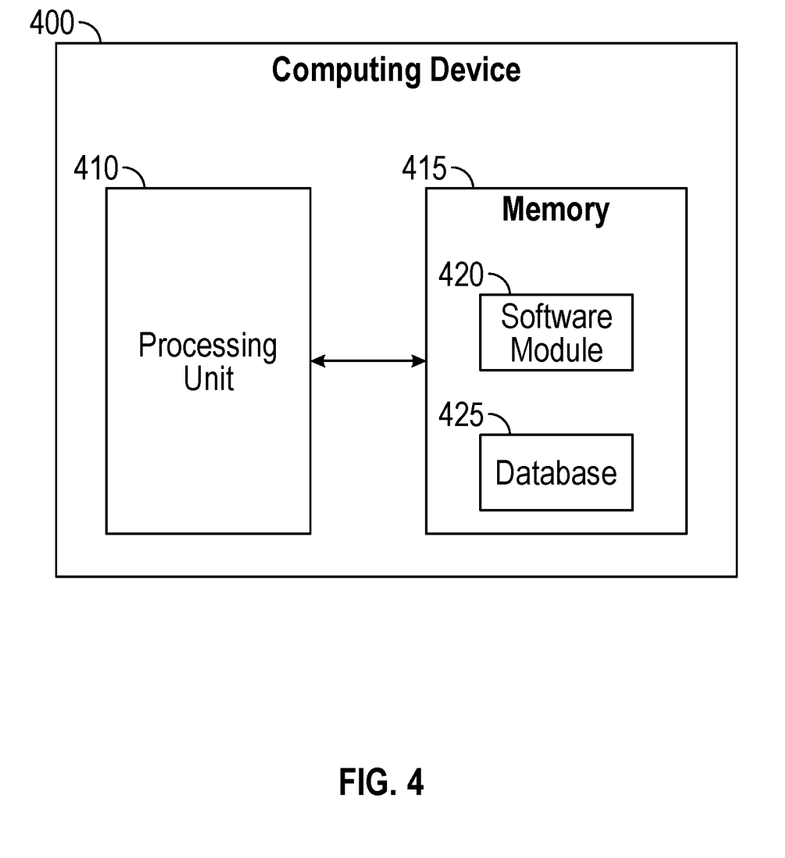
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. Database 425 may comprise and/or include, but is not limited to, a lookup table. Computing device 400, for example, may provide an operating environment for elements comprising RPD component 106 that may include, but are not limited to, Digital signal Processor 142, Digital Pre-Distortion actuator 144, and RPHY circuitry 132.

Computing device 400 may be implemented using a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
providing a first device level comprising a first plurality of Full Duplex (FDX) enhanced nodes, the first plurality of FDX enhanced nodes comprising a first FDX enhanced node and a second FDX enhanced node, the first plurality of FDX enhanced nodes being operated in a first mode;
providing a second device level comprising a third FDX enhanced node, the second device level being upstream from the first device level, the third FDX enhanced node being operated in a second mode;
providing to an input port of the first FDX enhanced node a same type of input that is being provided to an input port of the third FDX enhanced node;
providing to an input port of the second FDX enhanced node the same type of input that is being provided to the input port of the third FDX enhanced node; and
switching the first plurality of FDX enhanced nodes from being operated in the first mode to being operated in the second mode.

2. The method of claim 1, wherein the first plurality of FDX enhanced nodes being operated in a first mode comprises the first plurality of FDX enhanced nodes being operated in an enhanced mode in which the first plurality of FDX enhanced nodes are operated as FDX amplifiers.

3. The method of claim 1, wherein the third FDX enhanced node being operated in the second mode comprises the third FDX enhanced node being operated in a normal mode in which the third FDX enhanced node is operated as an FDX remote PHY device (RPD) node.

4. The method of claim 1, wherein switching the first plurality of FDX enhanced nodes comprises switching the first plurality of FDX enhanced nodes from being operated in the first mode comprising an enhanced mode in which the first plurality of FDX enhanced nodes are operated as FDX amplifiers to being operated in the second mode comprising a normal mode in which the first plurality of FDX enhanced nodes are operated as FDX RPD nodes.

5. The method of claim 1, wherein switching the first plurality of FDX enhanced nodes from being operated in the first mode to being operated in the second mode comprising sending a remote signal to the first plurality of FDX enhanced nodes that causes the first plurality of FDX enhanced nodes to stop operating in the first mode comprising an enhanced mode in which the first plurality of FDX enhanced nodes are operated as FDX amplifiers and to being operating in the second mode comprising a normal mode in which the first plurality of FDX enhanced nodes are operated as FDX RPD nodes.

6. The method of claim 1, wherein the second device level and the first device level are cascaded in a Hybrid Fiber-Coaxial (HFC) network.

7. The method of claim 1, wherein the type of input that is being provided to the input port of the third FDX enhanced node comprises fiber optic cable.

8. The method of claim 1, wherein the first FDX enhanced node serves first customer premises equipment via coaxial cable from output ports of the first FDX enhanced node and the second FDX enhanced node serves second customer premises equipment via coaxial cable from output ports of the second FDX enhanced node.

9. A method comprising:
providing a first device level comprising a first plurality of Full Duplex (FDX) enhanced nodes, the first plurality of FDX enhanced nodes comprising a first FDX enhanced node and a second FDX enhanced node, the first plurality of FDX enhanced nodes being operated in a first mode;
providing a second device level comprising a third FDX enhanced node, the second device level being upstream from the first device level, the third FDX enhanced node being operated in the first mode;
providing a third device level comprising a fourth FDX enhanced node, the third device level being upstream from the second device level, the fourth FDX enhanced node being operated in a second mode;
providing to an input port of the third FDX enhanced node a same type of input that is being provided to an input port of the fourth FDX enhanced node;
switching the third FDX enhanced node from being operated in the first mode to being operated in the second mode;
providing to an input port of the first FDX enhanced node a same type of input that is being provided to the input port of the third FDX enhanced node;
providing to an input port of the second FDX enhanced node the same type of input that is being provided to the input port of the third FDX enhanced node; and
switching the first plurality of FDX enhanced nodes from being operated in the first mode to being operated in the second mode.

10. The method of claim 9, wherein providing an upstream input of the third FDX enhanced node to an upstream input of the first FDX enhanced node, providing the upstream input of the third FDX enhanced node to an upstream input of the second FDX enhanced node, and switching the first plurality of FDX enhanced nodes from being operated in the first mode to being operated in the second mode occur a predetermined time period after switching the third FDX enhanced node from being operated in the first mode to being operated in the second mode.

11. The method of claim 9, wherein in the first mode comprises operating as an FDX amplifier.

12. The method of claim 9, wherein the second mode comprises operating as an FDX remote PHY device (RPD) node.

13. The method of claim 9, wherein the third device level, the second device level, and the first device level are cascaded in a Hybrid Fiber-Coaxial (HFC) network.

14. The method of claim 9, wherein the first FDX enhanced node serves first customer premises equipment via coaxial cable from output ports of the first FDX enhanced node and the second FDX enhanced node serves second customer premises equipment via coaxial cable from output ports of the second FDX enhanced node.

15. An apparatus comprising:
a radio frequency (RF) interface having:
an RF interface downstream analog input,
an RF interface downstream digital output,
an RF interface upstream digital input, and
an RF interface upstream analog output;
a Remote PHY device (RPD) having a downstream digital input and an upstream digital output; and
switching circuitry that switches:
a downstream digital input of the RPD between the RF interface downstream digital output and a first downstream digital input, and
an upstream digital output of the RPD between the RF interface upstream digital input and a first upstream digital output.

16. The apparatus of claim 15, wherein the apparatus comprises a full duplex (FDX) enhanced node.

17. The apparatus of claim 15, wherein the apparatus operates in a first mode when the switching circuitry switches the downstream digital input of the RPD to the RF interface downstream digital output and the upstream digital output of the RPD to the RF interface upstream digital input.

18. The apparatus of claim 17, wherein the first mode comprises operating as a full duplex (FDX) amplifier.

19. The apparatus of claim 15, wherein the apparatus operates in a second mode when the switching circuitry switches the downstream digital input of the RPD to the first downstream digital input and the upstream digital output of the RPD to the first upstream digital output.

20. The apparatus of claim 19, wherein the second mode comprises operating as an FDX RPD node.

* * * * *